Patented June 9, 1942

2,285,646

UNITED STATES PATENT OFFICE 2,285,646

COATING COMPOSITION AND PROCESS

Edwin T. Clocker, Bethlehem, Pa.

No Drawing. Original application January 24, 1940, Serial No. 315,409. Divided and this application August 3, 1940, Serial No. 351,101

9 Claims. (Cl. 106—253)

The present invention relates to coatings, such as paints, varnishes, and enamels, and the processes of preparing them, and particularly to coatings and processes including improved solubilized nonconjugated unsaturated nonhydroxylated siccative oils.

The present application is a division of my copending application Serial No. 315,409, filed January 24, 1940, now Patent No. 2,262,923, dated November 18, 1941, for Solubilized oily material, and this parent application is a continuation in part of my applications Serial No. 165,898, Patent No. 2,188,885 and Serial No. 759,086, Patent No. 2,188,882. The present application is related to my patent applications which resulted in Patents Nos. 2,188,883, 2,188,884, 2,188,886, 2,188,887, 2,188,888, 2,188,889, and 2,188,890. All of these applications are incorporated herein by reference and made a part hereof.

A purpose of my invention is to produce a coating including water-solubilized nonconjugated unsaturated nonhydroxylated siccative oil produced by condensing the oil at an intermediate point in its carbon chain with an acyclic olefinic acid having less than ten carbon atoms in the carbon chain, preferably an acyclic olefinic dicarboxylic acid, such as maleic acid or its anhydride, and combining the condensation product at the acidic grouping with an ammonia base of the class which consists of ammonia, water-soluble primary, secondary, and tertiary aliphatic amines and water-soluble hydrocarbon-residue substituted ammonium hydroxides.

A further purpose is to convert nonconjugated unsaturated nonhydroxylated siccative oils, such as linseed oil, perilla oil, sardine oil, and soya bean oil, into water-soluble materials which will quickly dry tack-free with a smooth level coat having good finish, with low penetration into porous materials and correspondingly low tendency to separate from pigment, and with good resistance to water.

A further purpose is to solubilize the condensation product of the present invention and mix it with water before incorporating pigment.

A further purpose is to mix the acidic condensation product of the present invention with a pigment, using the acidic property to facilitate grinding, and subsequently to combine the acidic grouping with an ammonia base of the class above referred to.

Further purposes appear in the specification and in the claims.

In my prior patent applications above referred to, the condensation of an acyclic olefinic acid having less than ten carbon atoms in the carbon chain at an intermediate point in the carbon chain of a nonconjugated unsaturated nonhydroxylated siccative oil is described.

The acyclic olefinic acid having less than ten carbon atoms in the carbon chain will preferably be dicarboxylic. The acyclic olefinic acid may be introduced in the form of the acid anhydride, as in any case at the temperatures used the anhydride of the acid will be produced. Suitable acyclic olefinic acids having less than ten carbon atoms in the carbon chain are maleic acid or its anhydride, one of the compounds which yield maleic anhydride or the like, such as malic acid, fumaric acid, aconitic acid, or citric acid, if subjected to the conditions under which maleic anhydride or the like is produced (Bernsthen, Textbook of Organic Chemistry (1923) pages 250 to 256), citraconic anhydride, crotonic acid, an alkyl substituted maleic acid having less than ten carbon atoms in its carbon chain, or maleic acid partially esterified with an aliphatic alcohol. The disclosure herein of acyclic olefinic acids having less than ten carbon atoms in the carbon chain is generic.

The longer the carbon chain of acyclic olefinic acid, the less vigorous is the condensation reaction. At the upper limit (nine carbon atoms in the carbon chain) the reaction is relatively mild. An acyclic olefinic acid having less than seven carbon atoms in the carbon chain produces a more vigorous reaction, and a still more vigorous reaction is obtained from an acyclic olefinic acid having less than five carbon atoms in the carbon chain.

The siccative oil is nonconjugated, unsaturated, and nonhydroxylated. This includes the nonconjugated unsaturated nonhydroxylated drying and semi-drying oils. These are triglyceryl esters of nonconjugated unsaturated nonhydroxylated fatty acids. Examples of oils of this character are linseed oil, hempseed oil, and walnut seed oil; all oils of the linseed class; perilla oil which is typical of the oils of the perilla class; semi-drying vegetable oils, such as soya bean oil, sunflower oil, and safflower oil; and fish oils of the type of sardine oil and menhaden oil.

In order that the condensation between the acyclic olefinic acid having less than ten carbon atoms in the carbon chain and the nonconjugated unsaturated nonhydroxylated siccative oil may take place, there should not be any material present during the condensation reaction which will interfere with the condensation reaction. In particular, no material should be present in substantial amount which will react with the acyclic olefinic acid more readily than does the siccative oil. Materials which would thus be objectionable include conjugated oils, which react with the acyclic olefinic acid very readily, and hydroxylated materials which form esters with the acyclic olefinic acid. Objectionable hydroxylated materials might be introduced in the form of mono-glycerides or di-glycerides of fatty acids, which will still further esterify. Objectionable hydroxyl groups may also be included by employing tri-glycerides of hydroxylated fatty acids which will undergo esterification at the carbon chain of the fatty acid portion of the glyceride molecule. The reference to the siccative oil as nonhydroxylated is intended to indicate that it is substantially free from objectionable hydroxyl groups, either in the form of hydroxylated fatty acid portions of the molecule or lower glycerides which would substantially interfere with the condensation reaction. The disclosure herein of nonconjugated unsaturated nonhydroxylated siccative oils is generic.

The condensation reaction between the acyclic olefinic acid having less than ten carbon atoms in the carbon chain and the nonconjugated unsaturated nonhydroxylated siccative oil is desirably accomplished by heating for an extended period of time at a temperature in excess of 150° C. and ordinarily below 300° C. The preferred reaction temperature is above 200° C. and above the boiling point of the acyclic olefinic acid with return condensation. When reacting at a temperature in excess of 200° C. and above the boiling point of the acyclic olefinic acid with return condensation, comparatively rapid condensation can be obtained. The heating is in any case continued until a substantial quantity of acyclic olefinic acid is combined at an intermediate point in the carbon chain of the siccative oil, that is, a point corresponding to a double bond in the oil.

The minimum time required for the condensation reaction will be approximately as follows:

| Temperature | Time |
| --- | --- |
| 150° C | hours 2 to 3 |
| 200° C | do 1 |
| 230° C | minutes 30 |
| 250° C | do 20 |
| 300° C | do 10 |

It will be understood, of course, that the time of reaction to some extent depends upon the pressure, presence or absence of catalyst, presence or absence of solvent and character of the reacting components, but the above figures are in general accurate.

In the condensation, it is preferred not to use sufficient acyclic olefinic acid having less than ten carbon atoms in the carbon chain to saturate all double bonds in the nonconjugated unsaturated nonhydroxylated siccative oil. The condensation product thus ordinarily has an iodine value. Generally it is sufficient to saturate one-third to one-sixth of the double bonds in the nonconjugated unsaturated nonhydroxylated siccative oil, although more ethylene linkages in the oil may be saturated, or the oil may be completely saturated, if desired. In the preferred embodiment, one molecular equivalent of acyclic olefinic acid to one molecular equivalent of nonconjugated unsaturated nonhydroxylated siccative oil will be proper proportions.

The condensation product is itself an oil insoluble in water. The desirable properties which are possessed by the product of the present invention are imparted by combining the condensation product at the acidic grouping with an ammonia base of the class which consists of ammonia, water-soluble primary, secondary, and tertiary aliphatic amines, and water-soluble hydrocarbon-residue substituted ammonium hydroxides. The disclosure of these compounds is generic. The reaction may be accomplished with ammonia in water solution, and for many purposes ammonia will be preferred as the neutralizing agent. Water-soluble primary, secondary, and tertiary aliphatic amines may be employed such as methylamine, ethylamine, propylamine, n. amylamine, tert. amylamine, di-methylamine, di-ethylamine, di-propylamine, di-n.-amylamine, di-tert.-amylamine, tri-methylamine, tri-ethylamine, tri-propylamine, tri-n.-amylamine, or the oxyamines such as mono-ethanolamine, di-ethanolamine, di-ethanolamine anhydride, and tri-ethanolamine. The amine should not be aromatic.

The ammonia base may also consist of a water-soluble hydrocarbon-residue substituted ammonium hydroxide, preferably a quaternary ammonium hydroxide. The hydrocarbon residue may be either aliphatic or aromatic. The hydrocarbon-residue substituted ammonium hydroxides commonly result from dissolving tri-amines in water; thus tri-methylamine in water forms tri-methyl ammonium hydroxide. Other tri-amines above behave similarly. Typical examples of water-soluble hydrocarbon-residue substituted ammonium hydroxides are tetra-ethyl ammonium hydroxide, tri-methyl vinyl ammonium hydroxide, tri-ethyl vinyl ammonium hydroxide, tri-methyl benzyl ammonium hydroxide, tri-methyl ammonium hydroxide, and tri-ethyl ammonium hydroxide.

No limit need be placed upon the aliphatic carbon chain in any of the ammonia bases as long as the material remains water-soluble.

In the case of oxyamines, the amine group is more reactive than the alcohol group and the reaction will be carried out with the theoretical quantity of condensation product to react with the amine group but not sufficient to react with the hydroxyl group. The hydroxyl group is not particularly advantageous in the case of these materials.

In producing paints employing the solubilized oil of the present invention, any pigment may be used which is non-reactive with the solubilized product. Suitable pigments are white lead; lithopone; barium sulphate; titanium dioxide; a double precipitate of titanium dioxide and barium sulphate; a mixture of white lead, titanium dioxide, and barium sulphate; cadmium sulphide yellow; a mixture of cadmium sulphide yellow and barium sulphate; cadmium sulphide red; a mixture of cadmium sulphide red and barium sulphate; iron oxide; bone black; and Prussian blue.

Basic lead sulphate is not recommended as it reacts to some extent with the solubilized oil to form a soluble double ammonium salt or analogous salt. Zinc oxide is also not recommended as it similarly forms a soluble zinc salt. In the case of white lead, if any reaction occurs a small amount of free fatty acid may be added to inhibit reaction with the solubilized oil.

In addition to the pigment, water-soluble dyes may be incorporated as desired. Adhesive materials, such as glue, casein, rubber latex, polymerized chloroprene (Neoprene) latex, or ammonium alginate may also be incorporated with the pigment.

The solubilized oil of the present invention may be mixed with any suitable resins and the resins solubilized by means of the oil. Suitable resins are ester gum, cumaron, cumaron-indene, cellulose nitrate, cellulose acetate, methyl cellulose, and ethyl cellulose.

In the manufacture of varnish by means of the solubilized oil of the present invention and varnish resins, surface tension depressants may desirably be employed, such as small quantities of aliphatic or aromatic alcohols, alcohol ethers, or alcohol ketones. Typical examples are butyl alcohol, iso-butyl alcohol, amyl alcohol, hexalin, $C_6H_{11}OH$, di-acetone alcohol, ethylene glycol mono-ethyl ether, or ethylene glycol mono-butyl ether. The varnishes may be pigmented to form enamels if desired.

Free fatty acid may optionally be incorporated in the coating composition as a stabilizer.

It is preferred to employ about thirty per cent of pigment to seventy per cent of the solubilized oil of the present invention by volume. The mixture of pigment and oil or of pigment, oil, and resin, with or without dye, may be diluted to any desired concentration with water, obtaining viscosities suitable for brushing, spraying, dipping, impregnating, or other processes of application. The paint, varnish, or enamel may be brushed satisfactorily where it contains forty per cent of the solubilized oil of the present invention mixed with pigment, and sixty per cent of water. Ordinarily the content of solubilized oil of the present invention and pigment will amount to from five to forty per cent of the water solution by volume. For many purposes five, ten, or fifteen per cent will be a satisfactory content.

One of the most important properties of the solubilized oil involved in the present invention is its ability to dry tack-free with great rapidity. Under normal atmospheric drying conditions it has been found that the linseed oil maleic anhydride ammonia product when painted in a solution containing sixty per cent of water by volume will dry tack-free in one to two hours (usually 30 to 45 minutes). This remarkable drying behavior is true of water paints, varnishes, and enamels generally in which the solubilized oil of the present invention is employed.

An interesting feature of the film is that no perceptible evolution of ammonia base occurs during the drying. This may possibly be due to a molecular rearrangement in which the ammonia base remains in the drying film, although this theoretical explanation is not of critical importance in the present invention.

A very important property of the film is that it is water-resistant and no longer water-soluble after drying. Where the film is painted on materials containing fixed bases, such as plaster and concrete, there is some evidence to indicate that calcium, magnesium, or the like replaces the ammonia base in the final product, with corresponding increase in water resistance and firmer adherence to the material coated.

The solubilized oil involved in the invention exhibits the property of limited penetration. Thus when painted on porous materials, the solubilized oil of the present invention does not soak into the porous material as would the original untreated oil, which leaves the pigment at the surface practically without oil content. The penetration of the solubilized oil of the present invention is so low that practically all of the oil remains protective. This colloidal effect is so pronounced that a mixture of the solubilized oil of the present invention and pigment in a water vehicle can be painted on filter paper without producing any pronounced oil ring due to penetration of the oil into the paper. The product of the present invention is recommended particularly for coatings such as paints, varnishes, and enamels, for plaster, stucco, concrete, plasterboard, wood, paper, fiberboard, cloth, leather, and the like, where penetration is likely to be a serious factor. The product of the present invention is useful for waterproofing fabrics, for waterproofing paper, and for patent leather coatings.

The film produced by drying the solubilized oil of the present invention is smooth with good leveling properties and a fine finish. The solubilized oil of the present invention does not liver on standing with pigment such as white lead.

Where insufficient ammonia base is added to completely neutralize the acidic groups of the condensation product, it is desirable to add an aliphatic alcohol to aid in conserving the oil-in-water dispersion. The partially neutralized condensation product is likely to form a water-in-oil dispersion of thick character, difficult to apply in water medium.

Any desirable concentration of water solution may be used. As a shop coat for metal pipe, structural steel and the like, a hard durable surface may be formed by dipping the metallic objects in a water solution of five per cent, ten per cent, or fifteen per cent of the solubilized oil of the present invention with or without pigment. For wood products a dip first coat may be obtained using twenty per cent or less of the solubilized oil of the present invention in water, with or without pigment. A twenty per cent solution of the solubilized oil of the present invention in water may be coated or impregnated on or in paper or cloth, and when dry has the appearance of a varnished product.

The following examples indicate the preparation of the initial condensation product of the present invention:

Example 1

In a pressure autoclave, 180 parts by weight of alkali-refined linseed oil is mixed with 20 parts by weight of maleic anhydride. The temperature is maintained from 230 to 260° C. for one hour and a pressure of about 30 pounds per square inch develops. The reaction may be obtained at 150° C., but it is much slower at this low temperature, and will preferably be carried out at a temperature of at least 200° C. and in excess of the boiling point of the acyclic olefinic acid. The temperature may be raised to as much as 300° C., or even somewhat higher, but the high temperature may cause some difficulty due to carbonization. After cooling, the reaction product is removed from the autoclave. The condensation product is in general appearance similar to the original linseed oil, but slightly darker and more viscous. It is miscible with acetone, ethyl acetate, ether, xylene, carbon tetrachloride, high petroleum hydrocarbons, and turpentine; and partly miscible with ninety-five per cent ethyl alcohol. The condensation product is miscible with fatty oils as well as cellulose derivatives such as nitrocellulose. It is insoluble in water. The iodine value is 141.4, as against 190.0 for the original linseed oil. The saponification value is 288 and the acid value is 52.9 determined in alcohol-benzol solution.

Example 2

To 180 parts by weight of linseed oil are added 25 parts by weight of citraconic anhydride and the mixture is heated in a three-neck flask equipped with a thermometer, mechanical stirrer, and a reflux condenser, at about 250° C. (which is above the boiling point of citraconic anhydride) for about three-quarters of an hour. At the end of this period, no further citraconic anhydride appears to condense under the reflux, indicating completion of the reaction. As a precaution, heating is continued for about fifteen minutes longer. The reaction product is less viscous than the maleic condensation product of linseed oil, as obtained in Example 1, but has the same properties otherwise.

Example 3

A mixture of 25 parts by weight of linseed oil and 2.4 parts by weight of crotonic acid are heated in a pressure autoclave at about 250° C. for about two hours. The condensation product has similar properties to the maleic condensation product obtained in Example 1.

Example 4

A mixture of 900 parts by weight of linseed oil and 112 parts by weight of maleic acid half-esterified with methyl alcohol are heated under pressure at about 250° C. for about two hours. The condensation product is generally similar to that of Example 1.

Example 5

The procedure of Example 1 is repeated using perilla oil instead of linseed oil. The product has properties generally similar to that of the condensation product of Example 1.

Example 6

Maleic anhydride and soya bean oil are heated together under the conditions and in the proportions set forth in Example 1. The condensation product dries more rapidly than the original oil, but the soya bean oil condensation product dries more slowly than the linseed oil condensation product. The properties are otherwise similar to those of the product of Example 1.

Example 7

Maleic anhydride and sardine oil are heated together under the conditions and in the proportions set forth in Example 1. The condensation product is more slow drying than the lineseed oil product of Example 1.

Example 8

The procedure of Example 2 is applied, using 180 parts of linseed oil and 20 parts of maleic anhydride by weight. The product is identical with the product of Example 1.

Example 9

Perilla oil is used instead of linseed oil in Example 8. The condensation product is identical with the perilla oil product obtained in Example 5.

Example 10

Maleic anhydride and soya bean oil are heated together under the conditions of Example 8. The condensation product is identical with the soya bean oil condensation product of Example 6.

Example 11

Maleic anhydride and sardine oil are heated together under the conditions of Example 8. The product is the same as that of Example 7.

Example 12

In any one of the above examples, soluble driers are added to the extent of 0.03% of cobalt, 0.05% of manganese, and 0.5% of lead, for example, in the form of linoleates and resinates. Driers added to the materials set forth above accelerate the drying.

Without limiting myself to an exact structure for the condensation product, it would appear that the condensation product is an addition product at a double bond in the carbon chain of the fatty acid of the nonconjugated unsaturated nonhydroxylated siccative oil. For example, if enough maleic anhydride is added to combine at only one double bond in the carbon chain of linolenic tri-glyceride, the condensation reaction will appear in general as follows:

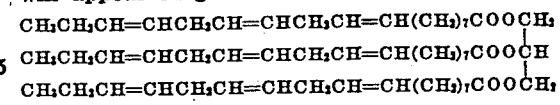

Linolenic tri-glyceride

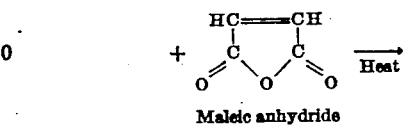

Maleic anhydride

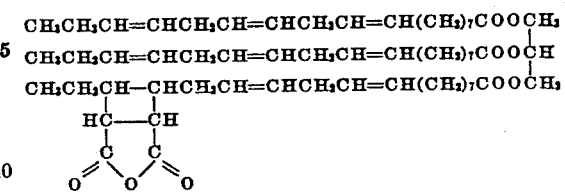

Maleic anhydride condensation product of linolenic tri-glyceride

Of course, if enough maleic anhydride is present, the same reaction will take place at each of the double bonds.

The formulae will, of course, be modified if linoleic tri-glyceride, oleic tri-glyceride, clupanodonic tri-glyceride, or undecylenic tri-glyceride be used instead of linolenic tri-glyceride, or if some other acyclic olefinic acid having less than ten carbon atoms in the carbon chain be used instead of maleic anhydride.

In order to obtain the solubilized oil of the present invention from the condensation product of Examples 1 to 12, the acidic group of the condensation product is neutralized with an ammonia base of the class which consists of ammonia, water-soluble primary, secondary, and tertiary aliphatic amines, and water-soluble hydrocarbon-residue substituted ammonium hydroxides.

Example 13

Seventy grams of the maleic linseed oil condensation product as obtained in Example 1 or 8 is ground with 200 grams of dry white lead to which is optionally added 2 grams of linseed oil free fatty acids to inhibit reaction of the ammonia salt with the white lead and to stabilize the resultant paint. Driers are added, for instance, as set forth in Example 12, and the whole is neutralized with the theoretical quantity of ammonia. Water is added gradually until the desired painting viscosity is reached. Good results are obtained with the viscosity secured after 150 ml. of water have been added. The paint dries very rapidly with a smooth durable finish, usually being tack-free after 30 minutes.

The above procedure is varied and a somewhat smoother paint obtained by adding the driers to the oil (optionally) and neutralizing the oil and diluting it with the full quantity of water before the pigment is incorporated. The only disadvantage of this procedure is that "grinding in" the pigment is more difficult, but the resulting paint is smoother.

The advantage of grinding the pigment with the oil condensation product before neutralizing is that the acidity of the condensation product facilitates incorporating the pigment in the oil, due to the dispersing properties of the acidic condensation product. This advantage exists particularly in the case of basic pigments. If neutralization were accomplished when the pigment and oil are first mixed, this advantage would not be obtained.

*Example 14*

Five hundred grams of white lead pulp (white lead-water slurry containing about 40% of dry white lead and 60% of water by volume) is shaken with 70 grams of the linseed oil maleic anhydride condensation product of Example 1 or 8, to which is optionally added 2 grams of linseed oil free fatty acids. When the oily condensation product has taken up all the pigment, the water is poured off. Driers are added, for instance as set forth in Example 12, and the whole is dispersed in 100 ml. of water containing the theoretical quantity of ammonia to neutralize the acidic groups in the solubilized oil.

*Example 15*

The procedure of Example 14 is repeated, neutralizing with the theoretical quantity of ethylene di-amine instead of ammonia. The water solubilized product resembles the product of Example 14, but dries more slowly.

*Example 16*

The procedure of Example 14 is repeated, neutralizing with the theoretical quantity of di-ethanolamine anhydride (Morpholine). The product resembles that of Example 15.

*Example 17*

Two hundred grams of dry white lead are ground in 70 grams of perilla oil maleic anhydride condensation product of Example 5 or 9. Driers are added and the whole is neutralized with the theoretical quantity of tri-ethylamine. Water is added with constant stirring until the desired painting viscosity is reached. The product is generally similar to the product of Example 13.

*Example 18*

Five hundred grams of white lead pulp containing about 40% of dry white lead and 60% of water by volume is shaken with 70 grams of the soya bean oil maleic anhydride condensation product of Example 6 or 10, to which has been added 2 grams of linseed oil free fatty acids. The water is poured off after the oily condensation product has taken up all the pigment. Driers are added and the whole is dispersed in about 100 ml. of water, containing enough tetraethyl ammonium hydroxide to neutralize the acidic groups in the oil.

*Example 19*

The procedure of Example 18 is followed, using ammonia in theoretical quantity instead of tetraethyl ammonium hydroxide. The product resembles that of Example 18, but dries somewhat more rapidly.

*Example 20*

To 70 grams of linseed oil maleic anhydride condensation product containing the requisite driers are added 10 grams of tri-methylamine dissolved in 10 ml. of water and the whole is warmed until a clear liquid results. The resulting vehicle is ground with 100 grams of titanium dioxide (Titanox A) and 30 grams of finely divided magnesium silicate (Asbestine). This product is diluted with water to painting viscosity. The resulting paint when applied in the usual manner dries to a very white film of great hiding power.

*Example 21*

One hundred grams of pigment consisting of a double precipitate of lithopone and barium sulphate (Cryptone BA 19) is ground with 70 grams of the refined sardine oil maleic anhydride condensation product of Example 7 or 11, with the requisite driers added. The acidic groups are neutralized with ammonia and the resulting product is mixed with sufficient water to give the desired painting viscosity. This paint is quick drying, giving a hard glossy film. Under ordinary drying conditions it will dry tack-free in from one to two hours (usually 45 minutes to one hour).

*Example 22*

Fifty grams of a varnish containing resin-to-oil in the ratio of 100 pounds of resin to 30 gallons of oil (known in the trade as a 30 gallon varnish) is prepared using the linseed oil maleic anhydride condensation product of Example 1 or 8 with cumaron-indene resin. To this varnish is added the requisite driers and preferably 5 grams of iso-butyl alcohol as a surface tension depressant. The acidic groups in the vehicle are neutralized by the theoretical amount of ammonia, and water added slowly with constant stirring until the desired viscosity is reached. The resulting product dries to a clear varnish film.

Instead of cumaron-indene resin, similar results may be obtained using ester gum.

*Example 23*

The varnish of Example 22 is ground with 100 grams of lithopone to give a water soluble enamel. The enamel film is hard and glossy and has all the appearance of a nonaqueous enamel.

*Example 24*

Fifty grams of linseed oil maleic anhydride condensation product, to which has been added the required driers, is dispersed in 50 ml. of water containing 3 grams of ethylene diamine. The resultant creamy dispersion may be diluted with water to any desired viscosity. When dry the film is clear and tough and shows great water resistance.

*Example 25*

In each of the above examples, instead of the pigment used, a mixture of white lead and titanium dioxide plus barium sulphate (Titanox B) in equal parts, a mixture of cadmium sulphide yellow and barium sulphate in equal parts, a mixture of cadmium sulphide red and barium sulphate in equal parts, iron oxide red or bone black is employed as a pigment. The resultant paint dries to a hard water resistant film with low penetration of the oil. The film has a smooth surface of good leveling properties which quickly becomes tack-free. In each of the examples mentioned above, the condensation product of any of the oils above referred to may be employed instead of the condensation product of the particular oil referred to in the example.

The product of the invention is useful generally for coating purposes, but its widest utility is believed to be in paints, varnishes, and enamels for porous materials, such as plaster, stucco, concrete, plasterboard, wood, paper, fiberboard, cloth, and leather where the feature of limited penetration, coupled with the quick drying, satisfactory leveling, good finish, and water resistance are important. As already explained, the material has special advantage for painting products containing a fixed base, such as plaster, stucco, and concrete which have available CaO, because of the tendency of the lime to replace the ammonia base in the resultant film, increasing the water resistance and the firmness of adherence.

It will be understood that the condensation of minute amounts of the acyclic olefinic acid having less than ten carbon atoms in the carbon chain with the nonconjugated unsaturated nonhydroxylated siccative oil will not appreciably change the character of the latter. In general, at least one per cent of the acyclic olefinic acid should be combined in the condensation product to insure a distinctive character of the product. When one per cent only of the acyclic olefinic acid is combined in the condensation product, the oil may be fairly well emulsified in water. When two per cent is combined, the oil may be well emulsified. When five per cent is combined the oil is completely solubilized.

In view of my invention and disclosure variations and modifications to meet individual whim or particular need will doubtless become evident to others skilled in the art, to obtain all or part of the benefits of my invention without copying the process and composition shown, and I, therefore, claim all such in so far as they fall within the reasonable spirit and scope of my invention.

Having thus described my invention, what I claim as new and desire to secure by Letters Patent is:

1. A liquid coating composition in water vehicle consisting essentially of a water-soluble condensation product of an acyclic olefinic acid having less than ten carbon atoms in the carbon chain combined at an intermediate point in a carbon chain of a nonconjugated unsaturated nonhydroxylated siccative oil, and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

2. A liquid coating composition in water vehicle consisting essentially of a water-soluble condensation product of an acyclic olefinic dicarboxylic acid having less than ten carbon atoms in the carbon chain combined at an intermediate point in a carbon chain of a nonconjugated unsaturated nonhydroxylated drying oil, and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

3. A liquid coating composition in water vehicle consisting essentially of a water-soluble condensation product of maleic anhydride combined at an intermediate point in a carbon chain of a nonconjugated unsaturated nonhydroxylated siccative oil, and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

4. A liquid coating composition in water vehicle consisting essentially of a water-soluble condensation product of maleic anhydride combined at an intermediate point in a carbon chain of linseed oil and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

5. A liquid coating composition in water vehicle consisting essentially of a water-soluble condensation product of maleic anhydride combined at an intermediate point in a carbon chain of perilla oil and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

6. A liquid coating composition in water vehicle consisting essentially of a water-soluble condensation product of maleic anhydride combined at an intermediate point in a carbon chain of soya bean oil and neutralized at the acidic grouping with an ammonia base of the class which consists of ammonia, water-soluble primary, secondary, and tertiary aliphatic amines and water-soluble hydrocarbon-residue substituted ammonium hydroxides, and a pigment maintained in dispersion by the condensation product in addition to the water vehicle.

7. A liquid coating composition in water vehicle consisting essentially of a water-soluble condensation product of an acyclic olefinic acid having less than ten carbon atoms in the carbon chain neutralized at an intermediate point in a carbon chain of a nonconjugated unsaturated nonhydroxylated siccative oil, and combined at the acidic grouping with an ammonia base of the class which consists of ammonia, water-soluble primary, secondary, and tertiary aliphatic amines and water-soluble hydrocarbon-residue substituted ammonium hydroxides, a pigment maintained in dispersion by the condensation product, and free fatty acid, inhibiting reaction between the condensation product and the pigment, in addition to the water vehicle.

8. The process of producing a water-soluble liquid coating composition, which comprises adding water to the condensation product of an acyclic olefinic acid having less than ten carbon atoms in the carbon chain combined at an intermediate point in a carbon chain of a nonconjugated unsaturated nonhydroxylated siccative oil, and neutralized with an ammonia base of the class which consists of water-soluble primary, secondary, and tertiary aliphatic amines and water-soluble hydrocarbon-residue substituted ammonium hydroxides, and subsequently incorporating the neutralized condensation product and water with a pigment.

9. The process of producing a water-soluble liquid coating composition, which comprises mixing together a pigment and the acidic condensation product of an acyclic olefinic acid having less than ten carbon atoms in the carbon chain combined at an intermediate point in a carbon chain of a nonconjugated unsaturated nonhydroxylated siccative oil, and subsequently neutralizing with an ammonia base of the class which consists of ammonia, water-soluble primary, secondary, and tertiary aliphatic amines and water-soluble hydrocarbon-residue substituted ammonium hydroxides and adding water.

EDWIN T. CLOCKER.